Sept. 18, 1956     A. Y. DODGE     2,763,141
SLIP COUPLING
Filed Jan. 11, 1955
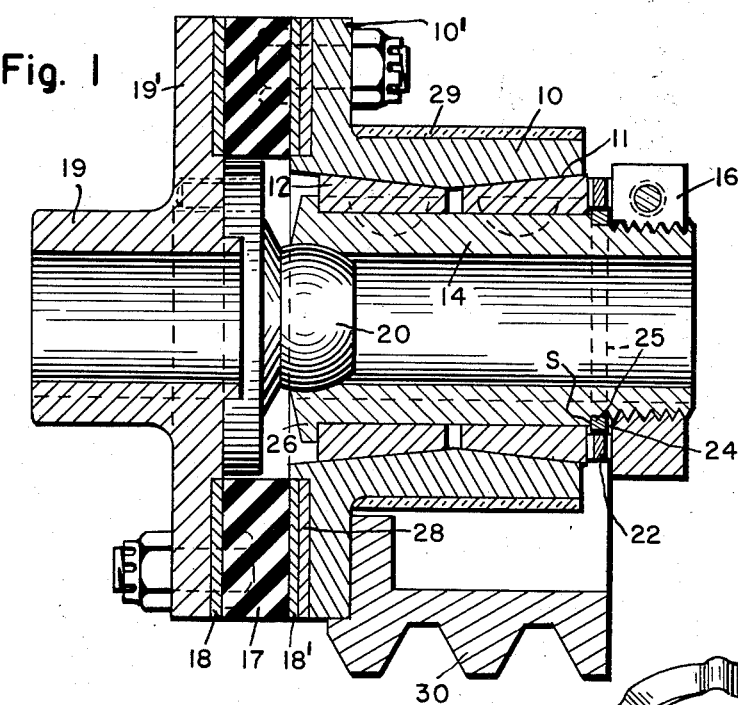
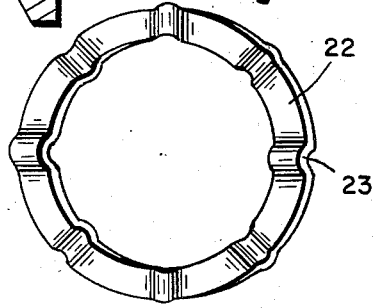
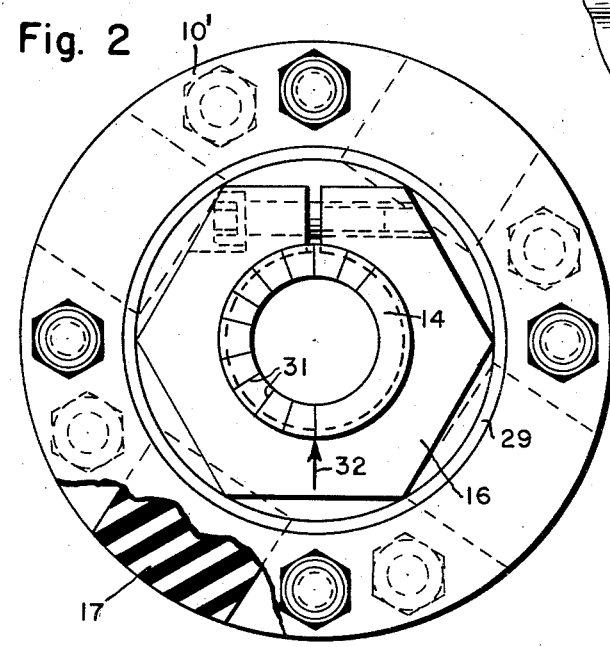
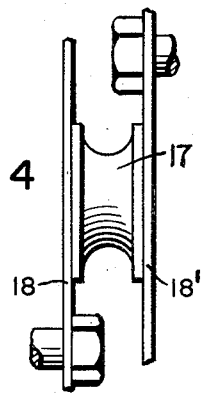
INVENTOR.
Adiel Y. Dodge 2,763,141
Patented Sept. 18, 1956

2,763,141

SLIP COUPLING

Adiel Y. Dodge, Rockford, Ill.

Application January 11, 1955, Serial No. 481,064

10 Claims. (Cl. 64—30)

The objects of this invention are to provide:

First, a shaft coupling which will slip when the torque loads occur in excess of a pre-determined load. Such a coupling which is responsive to the heat generated by said slipping thereby reduces the load it is transmitting.

Second, a coupling in which a balance between load and expansion due to heat generated by slipping will be reached at a safe temperature—safe as to fire hazard and as to damage to the coupling parts.

Third, the above objects plus a flexible coupling—flexible as to angular misalignment, shaft eccentricity, and as to shock loads.

Fourth, the above features plus advantages and conveniences of a flanged coupling.

Fifth, a slip coupling, parts of which may be used as a hub on which to mount a sheave or a pulley for belt drives.

I accomplish these and other objects as set forth herein and in the appended drawings in which:

Figure 1 is a side elevation in section showing one form of my coupling;

Figure 2 is an end view looking toward the right end of Figure 1;

Figure 3 is an isometric perspective of the spring washer part 22;

Figure 4 is a fragmentary view showing parts 17 as viewed radially.

In Figure 1, I have shown a slip coupling featuring my invention comprising a double cone clutch and a special engaging means therefor. The slip coupling portion is made up chiefly of parts 10, 11, 12, 14, 16, and 22. The hub 10 is made of a metal having high coefficient of thermal expansion and also a good resistance to galling or abrading due to bearing friction. I have found phosphorous bronze and aluminum bronze to be good material for this part, which forms the outer cone of the clutch.

Parts 11 and 12 form the inner conical members of the clutch. They are made of a substance having a relatively low coefficient of thermal expansion, such as cast iron or Pyrex glass. In addition to having a low coefficient of expansion, the material must resist galling and abrading when rubbing with the material selected for outer cone 10.

Outer cone, or outer concave cone where used herein shall mean the more or less cylindrical part having an internal concave surface corresponding to that of a frustrum of a right circular cone truncated.

Double outer cone where used herein shall mean the more or less cylindrical part having internal concave surfaces of two frustrums of cones placed in tandem axis on axis, truncated end to truncated end.

Inner convex cone where used herein shall mean the more or less cylindrical part having a convex external surface that of the frustrum of a truncated right circular cone.

These two inner cones are drawn together and into engagement with the outer cone 10 by the sleeve 14.

Sleeve 14 is made from a metal having a high coefficient of thermal expansion, for the reasons set forth later. Sleeve 14 is provided with a shoulder 26 and a threaded end to take nut 16. Spring washer 22 lies between the nut and the base of cone 11.

As seen in Figure 1, this coupling may take a form similar to a flanged type coupling having flanged hub 19 and 19′ shown at the left end and a flanged hub member 10 and 10′ shown on the right end. The flanges 19′ and 10′ are separated by blocks of rubber-like material 17. These blocks 17 are vulcanized or otherwise cemented to the metal rings 18 and 18′ to form a separate assembly.

This separate assembly makes for convenience when assembling the coupling in place on a machine. This sub-assembly may be brought into place between the flanges 19′ and 10′ and bolted in place by the cap screws and nuts shown. The metal mounting rings 18 and 18′ are located concentrically by the shoulders shown for this purpose.

So that the rubber-like blocks may stand repeated shock loads without tearing loose from their mounting rings, they have been given a special shape as seen when viewed along a radial line (see Figure 4). The larger bases of the spool shaped member are vulcanized to the mounting rings providing a yieldable yet secure hold, much more effective than is had by an abrupt rectangular block. However, other forms of cushion connections may be employed, this being one preferred form only.

In order to protect the block 17 against heat, I have provided a ring of heat insulating material 28 lying between flange 10′ and mounting ring 18′. In some cases, it is desirable to provide heat insulation on the outer side of hub 10 as shown at 29. This prevents too rapid heat dissipation at the hub 10, also confines the heat where it will do no harm; i. e. minimum fire hazard.

Since the amount of expansion which will take place at temperatures below 500° F. are not large, one must find a way to deal with small movements and yet effect considerable change in torque capacity due to expansion due to heat. I accomplish this in part by designing a spring washer with a high spring rate, yet having a nearly uniform rate. Each segment lying between alternate beads 23 forms a simple beam supported by negative beads while loaded at the opposite or positive beads. Since the beams are simple and short, the rate is high but quite uniform over a small but ample range.

In one size coupling, I employ a washer (the deflection characteristics of this washer are much more uniform than that of an undulated spring washer) which deflects .040 inch under its maximum load of 1000 pounds and has a rate of .004 inch per 100 lbs. If the nut 16 has a 16 pitch thread, then each 20° turn will cause .00347 inch deflection or 87 lbs. per 20° turn.

In order to prevent overadjustment, I provide a washer 25 of a selected thickness to permit only .040 inch compression of the spring washer 22. When the spring washer 22 has been compressed .040, the washer 25 stops the nut 16 from further movement to the left by filling the gap 24 between the shoulder S and the nut 16. After this, the nut can compress the spring washer 22 no further; thus the slip coupling remains a safety device which it would not if the coupling could be overadjusted.

In operation under normal conditions, torque is transmitted from the shaft to sleeve 14 through keys or the like in a conventional manner. Torque is also transmitted from sleeve 14 to cones 11 and 12 through keys as shown or other conventional means. Torque is transmitted between cones 11 and 12 to outer cone 10 by friction. When an overload of torque occurs above and beyond a predetermined amount of torque, slipping takes place between the outer cone 10 and the inner cones 11 and 12. Should the slipping continue, heat will be generated at these slipping surfaces.

The slip that takes place between parts 10 and 11 due to overload will generate heat. The heat will cause expansion of all parts but since the expansion of part 10 is greater than the expansion of parts 11 and 12, and again the expansion of 14 is greater than that of 11 or 12, the engaging force imposed by spring washer 22 will be caused to diminish as the heat is generated.

Since the spring washer 22 is designed to have a high rate, the force it creates will drop off rapidly as slackening takes place due to expansion. Under cases where continued slipping occurs, a balance is reached between torque load and the change in size of parts due to the temperature reached. In order to retain some of the heat in part 10, an insulation covering 29 is provided. An insulation 28 is also provided to protect the rubber-like parts 17 against overheating.

A suitable dry lubricant such as flaked graphite or the like may be employed. Parts 10, 11, and 12 may have suitable grooves to retain a dry lubricant (not shown). The heat generated will cause expansion of coupling parts 10, 11, 12, and 14. However, due to the physical properties of the material employed, the expansion of 10 will be greater than that of 11 and 12, thereby allowing spring 22 to push parts 11 and 12 together; but since spring washer 22 has a high rate, the force drops off rapidly as said movement takes place. Furthermore, additional loosening movement occurs due to the higher thermal expansion of sleeve 14.

I accomplish the desired results by the selection of materials having different rates of thermal expansion in connection with a high rate spring washer plus the control of heat dissipation. The two parts 10 and 14 tend to expand to loosen the engagement, whereas in effect only one part (namely, the divided inner cone) expands to tighten the engagement and that at a relatively smaller rate.

Thus I have produced a combination which will slip and bring about a reasonable heat balance, brought about by a decreasing load due to decreasing tension, decreasing until a degree of heat is reached wherein continuous slipping may take place at a temperature below the danger point, either to create combustion or to damage its own parts.

In order that this slip coupling may be a flexible coupling, it is proposed that rubber-like member 17 be interposed between the flanges 19' and 10'. As shown in Figure 4, the parts 17 may have a spool shape, thereby exposing a large base to the mounting rings 18 and 18'. It is proposed that the spool shape rubber-like spools be vulcanized or cemented to the mounting rings 18 and 18'.

In some cases, a fully flexible coupling, flexible as to angular misalignment and eccentricity is desired. In this case, the ball connection member 20 will be omitted. In other cases where the input shaft is to support the output shaft or vice versa, the ball 20 may be employed, in which case the coupling is merely flexible as to angular misalignment and not eccentricity. However, in either case, this coupling yields to shock loads.

In still other cases, this slip coupling may be used to drive a belt pulley or sheave as illustrated at 30. In fact, in some cases it may be desirable to provide a shaft drive slip coupling and a belt drive slip coupling. This may be provided as shown by including the sheave or pulley 30.

If the parts of this slip coupling are carefully made and inspected, uniform results can be attained which justify the following. Graduations of 20° may be marked on the end of sleeve 14 as shown at 31. It is suggested that an arrow 32 be stamped on the nut 16 at assembly to register with the first of the marks 31 to indicate the position of nil torque load, after such position is determined at assembly. When the nut is tightened, the torque load increases substantially in equal amounts for each degree mark tightened.

Having thus described one embodiment of my invention, it will be understood that this is illustrative only and is not to be taken as a definition of the invention, reference being had for this purpose to the appended claims.

I claim the following as my invention:

1. In a temperature responsive slip coupling, the combination of a friction clutch comprising an inner cone and an outer cone urged into frictional engagement by a very high-rate spring, the outer cone made from metal having a high coefficient of thermal expansion, the inner cone made from metal having a lower rate of thermal expansion, means to impart the spring force to each cone in opposed directions to force them together, consisting of an inner cylindrical member made from metal having a high thermal coefficient of expansion, thus causing the net expansion due to heat to increase the compressed length of the spring, thereby to reduce the force causing frictional engagement, thence to reduce the torque being transmitted.

2. A torque limiting slip coupling comprising a tubular outer member having its inner surface conically flared toward one end in the form of a right circular cone and formed of a material having a relatively high coefficient of thermal expansion, an inner member fitting into the outer member and having an outer conical surface engaging the conical inner surface of the outer member, the inner member being formed of a material having a lower coefficient of thermal expansion than the outer member, and means including a high rate spring washer urging the inner member axially into the outer member.

3. A torque limiting slip coupling comprising a tubular outer member having its inner surface formed as a frustrum of a right circular cone and made from a material having a relatively high coefficient of thermal expansion, an inner member fitting into the outer member and having an outer conical surface frictionally engaging the inner conical surface of the outer member, the inner member being formed of a material having a lower coefficient of thermal expansion than the outer member, and an axially elongated supporting member for the inner member urging the inner member axially to hold the conical surfaces of the inner and outer members in engagement, the supporting member being formed of a material having a relatively high coefficient of thermal expansion so that when heated it expands faster than the inner member and tends to reduce the force urging the conical surfaces of the inner and outer members into engagement.

4. A torque limiting slip coupling comprising a tubular outer member having its inner surface formed as a frustrum of a right circular cone and made from a material having a relatively high coefficient of thermal expansion, an inner member fitting into the outer member and having an outer conical surface frictionally engaging the inner conical surface of the outer member, the inner member being formed of a material having a lower coefficient of thermal expansion than the outer member, an axially elongated supporting member for the inner member urging the inner member axially to hold the conical surfaces of the inner and outer members in engagement, the supporting member being formed of a material having a relatively high coefficient of thermal expansion so that when heated it expands faster than the inner member and tends to reduce the force urging the conical surfaces of the inner and outer members into engagement, and a covering of heat insulating material over the outer member.

5. A torque limiting slip coupling comprising a tubular outer member having its inner surface formed as a frustrum of a right circular cone and made from a material having a relatively high coefficient of thermal expansion, an inner member fitting into the outer member and having an outer conical surface frictionally engaging the inner conical surface of the outer member, the inner member being formed of a material having a lower coefficient of thermal expansion than the outer member, an elongated tension sleeve extending through the inner member and formed of a material having a relatively high coefficient of thermal expansion, and a high rate spring washer acting between the sleeve and the inner member and urging the inner member axially to hold the conical surfaces of the inner and outer members in engagement.

6. The construction of claim 5 including a heat insulating covering over the outer member.

7. A torque limiting slip coupling comprising a tubular outer member formed of a material having a relatively high coefficient of thermal expansion and its inner surface flaring outwardly toward its ends in the form of two truncated right circular cones, an elongated supporting member extending axially through the outer member and formed of a material having a relatively high coefficient of thermal expansion, a pair of inner members on the supporting member having conical outer surfaces fitting into the outer member and against the conical surfaces thereof respectively, the inner members being formed of a material having a lower coefficient of thermal expansion than the outer and supporting members, and means to limit axial movement of the inner members relative to the supporting member to hold the conical surfaces in engagement.

8. The construction of claim 7 in which the last named means includes a high rate spring washer.

9. A torque limiting slip coupling comprising a tubular outer member formed of a material having a relatively high coefficient of thermal expansion and its inner surface flaring outwardly toward its ends in the form of two truncated right circular cones, an elongated supporting member extending axially through the outer member and formed of a material having a relatively high coefficient of thermal expansion, a pair of inner members on the supporting member having conical outer surfaces fitting into the outer member and against the conical surfaces thereof respectively, the inner members being formed of a material having a lower coefficient of thermal expansion than the outer and supporting members, means to limit axial movement of one of the inner members on the supporting member, and a high rate spring washer acting between the supporting member and the other inner member urging the other inner member axially toward said one of the inner members.

10. The construction of claim 9 including a heat insulating covering over the outer member.

References Cited in the file of this patent

UNITED STATES PATENTS

| | | |
|---|---|---|
| 788,810 | Ambler | May 2, 1905 |
| 804,778 | Smith | Nov. 14, 1905 |
| 2,618,136 | Wellauer | Nov. 18, 1952 |

FOREIGN PATENTS

| | | |
|---|---|---|
| 258,239 | Great Britain | Apr. 21, 1927 |
| 431,026 | Great Britain | June 28, 1935 |